United States Patent
Chan (10) Patent No.: US 10,536,828 B1
(45) Date of Patent: Jan. 14, 2020

(54) KEEPING RADIO RESOURCE CONTROL ACTIVITY AFTER SMS WAKEUP

(71) Applicant: FORD GLOBAL TECHNOLOGIES, LLC, Dearborn, MI (US)

(72) Inventor: Kwong Hang Kevin Chan, Kanata (CA)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/148,194

(22) Filed: Oct. 1, 2018

(51) Int. Cl.
| | | |
|---|---|---|
| *H04W 4/44* | (2018.01) | |
| *H04W 76/27* | (2018.01) | |
| *H04W 4/14* | (2009.01) | |
| *H04M 1/725* | (2006.01) | |
| *H04W 52/02* | (2009.01) | |

(52) U.S. Cl.
CPC ......... *H04W 4/44* (2018.02); *H04M 1/72533* (2013.01); *H04W 4/14* (2013.01); *H04W 52/0229* (2013.01); *H04W 76/27* (2018.02)

(58) Field of Classification Search
CPC ......... H04W 52/0229; H04W 52/0251; H04W 52/0261; H04W 76/28; H04W 52/028; H04W 72/1284; H04W 52/0222; H04W 72/04; H04W 52/0216; H04W 72/0406; H04W 52/0258; H04W 72/02; H04W 72/0413; H04W 4/44; H04W 76/27; H04W 4/14; H04M 1/72533
See application file for complete search history.

(56) References Cited

U.S. PATENT DOCUMENTS

| | | | |
|---|---|---|---|
| 8,781,442 B1 * | 7/2014 | Link, II | G08G 1/205 455/411 |
| 9,676,385 B2 | 6/2017 | Kang | |
| 10,107,888 B1 * | 10/2018 | Choi | H04L 12/40163 |
| 2004/0127206 A1 * | 7/2004 | Van Bosch | H04W 52/0216 455/418 |
| 2006/0123119 A1 * | 6/2006 | Hill | H04L 67/14 709/227 |
| 2012/0113905 A1 * | 5/2012 | Anderson | H04W 76/38 370/329 |
| 2016/0142888 A1 * | 5/2016 | Moon | H04W 4/12 455/414.1 |
| 2016/0150589 A1 * | 5/2016 | Zhao | H04L 67/14 370/328 |
| 2016/0210157 A1 | 7/2016 | Kim | |

FOREIGN PATENT DOCUMENTS

WO     2018036609 A1     3/2018

OTHER PUBLICATIONS

Energy Saving in Automotive E/E Architectures by Liebetrau, Liebetrau et al., dated Dec. 2012 (Year: 2012).*

\* cited by examiner

*Primary Examiner* — Daniel Lai
(74) *Attorney, Agent, or Firm* — Michael J. Spenner; Brooks Kushman P.C.

(57) ABSTRACT

A vehicle includes a gateway and a telematics controller. The controller is programmed to generate a signal to transition the gateway from sleep to powered state responsive to receipt of a wakeup message over a network; initialize a gateway cloud connector and a timer to periodically send ping messages to keep radio resource control alive; and responsive to inactivity over the network for a predefined period, discontinue the timer and transition the gateway from powered to sleep state.

20 Claims, 4 Drawing Sheets

KEEPING RADIO RESOURCE CONTROL ACTIVITY AFTER SMS WAKEUP

TECHNICAL FIELD

Aspects of the disclosure generally relate to reducing command round trip time by keeping radio resource control (RRC) active after receiving a wakeup short message service (SMS) message for vehicle remote command during a low power mode.

BACKGROUND

Connected vehicle services operate by sending messages from a cloud service to a vehicle. For example, the cloud service may request a vehicle to unlock doors, roll down windows, or provide a response indicating a state of charge of the vehicle battery.

SUMMARY

In one or more illustrative examples, a vehicle includes a gateway and a telematics controller. The controller is programmed to generate a signal to transition the gateway from sleep to powered state responsive to receipt of a wakeup message over a network; initialize a gateway cloud connector and a timer to periodically send ping messages to keep radio resource control alive; and responsive to inactivity over the network for a predefined period, discontinue the timer and transition the gateway from powered to sleep state.

In one or more illustrative examples, a method includes transitioning a gateway of a vehicle from sleep to powered state responsive to receipt of a wakeup message over a network; initializing a gateway cloud connector and periodically sending ping messages to keep radio resource control alive; and responsive to inactivity over the network for a predefined period, discontinuing the ping messages and transitioning the gateway from powered to sleep state.

In one or more illustrative examples, a non-transitory computer readable medium includes instructions that, when executed by one or more processors of a vehicle, cause the vehicle to transition a vehicle gateway from sleep to powered state responsive to receipt of a wakeup message over a network; initialize a gateway cloud connector and periodically sending ping messages to keep radio resource control alive; and responsive to inactivity over the network for a predefined period, discontinue the ping messages and transition the gateway from powered to sleep state.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Roundtrip vehicle command response time may be defined as an amount of time it takes from the user issuing a remote command (e.g., remote lock, remote start) from a mobile application executed by a user's phone or other mobile device, to the time when the application receives an acknowledgement that the remote command has been accomplished. For such mobile commands, every millisecond of improvement in the roundtrip response time results in a better overall user experience.

A vehicle may enter a low power registered mode after key-off, e.g., after 30 minutes of a vehicle being powered off (e.g., in park). While in the low power registered mode, the enhanced central gateway (ECG) of the vehicle may relax into a sleep state, awaiting a wakeup message from the CAN bus. A telematics control unit (TCU) of the vehicle may similarly be in circuit switched (CS) only mode (e.g., SMS only mode) without any data connectivity.

Responsive to a user invoking a remote command while the vehicle is in low power mode, the mobile device may send a message to the service delivery network (SDN), which in turn may send a short message service (SMS) message to the TCU. The TCU may, in turn, generate a CAN signal to the ECG to wake the ECG. Responsive to the ECG receiving the CAN signal, the ECG may transition from the sleep state back to a powered-up state. The process of the ECG booting up from the sleep state may require about 7-8 seconds in some vehicles. In addition, the cloud connector of the ECG may require about 4-5 seconds to connect with the cloud server because the ECG has to set up an ethernet link to the TCU and the TCU may have to process the data request from the cloud connector and interact with the wireless network. In total, the overall time from receiving the wakeup SMS to achieving cloud connectivity for the vehicle may exceed 10 seconds.

On the other hand, on the TCU side, after the incoming SMS has been received, the RRC may transition to idle. On some networks, this transition from active to idle may occur after expiration of a timer of, e.g., a 10 second timeout during which no network activity is detected. The transition to idle is usually triggered by the network. On some networks, the transition can happen after 5 seconds of inactivity. Whenever RRC has transitioned to idle, it usually takes about 250 milliseconds under LTE coverage for the TCU to reestablish RRC with the network and undergo security mode procedures before data communication can be resumed. Under 3G coverage, this process can take on the order of 900 milliseconds.

An improved TCU can eliminate the additional time expended to bring up the RRC. If the TCU is configured to keep the RRC active after receiving a wakeup SMS, the TCU can improve the overall response time for command messages by the amount of time required to reestablish RRC. This keep-alive functionality may be accomplished by sending ping messages, for example, every 5 seconds, after reception of an incoming SMS from the TCU. In other examples, the inactivity time for the network may be self-learned by the system. Accordingly, the RRC may avoid going into idle. Thus, once the cloud connector is ready to send data, the RRC may already be set up and ready to interact with the network.

Additionally, a RRC keep alive timer database can be pre-provisioned on the improved TCU. The improved TCU determines the value of RRC keep alive timer by referencing the database with the public land mobile network (PLMN) the TCU is currently attached to. When an improved TCU is attached to a network where the RRC keep alive timer is not pre-provisioned, the TCU can go through self-learning of the RRC keep-alive timer by observing the activity over a network and when RRC is released by the network. The improved TCU can also update the RRC keep-alive timer database after going through the self-learning.

Figure 1:
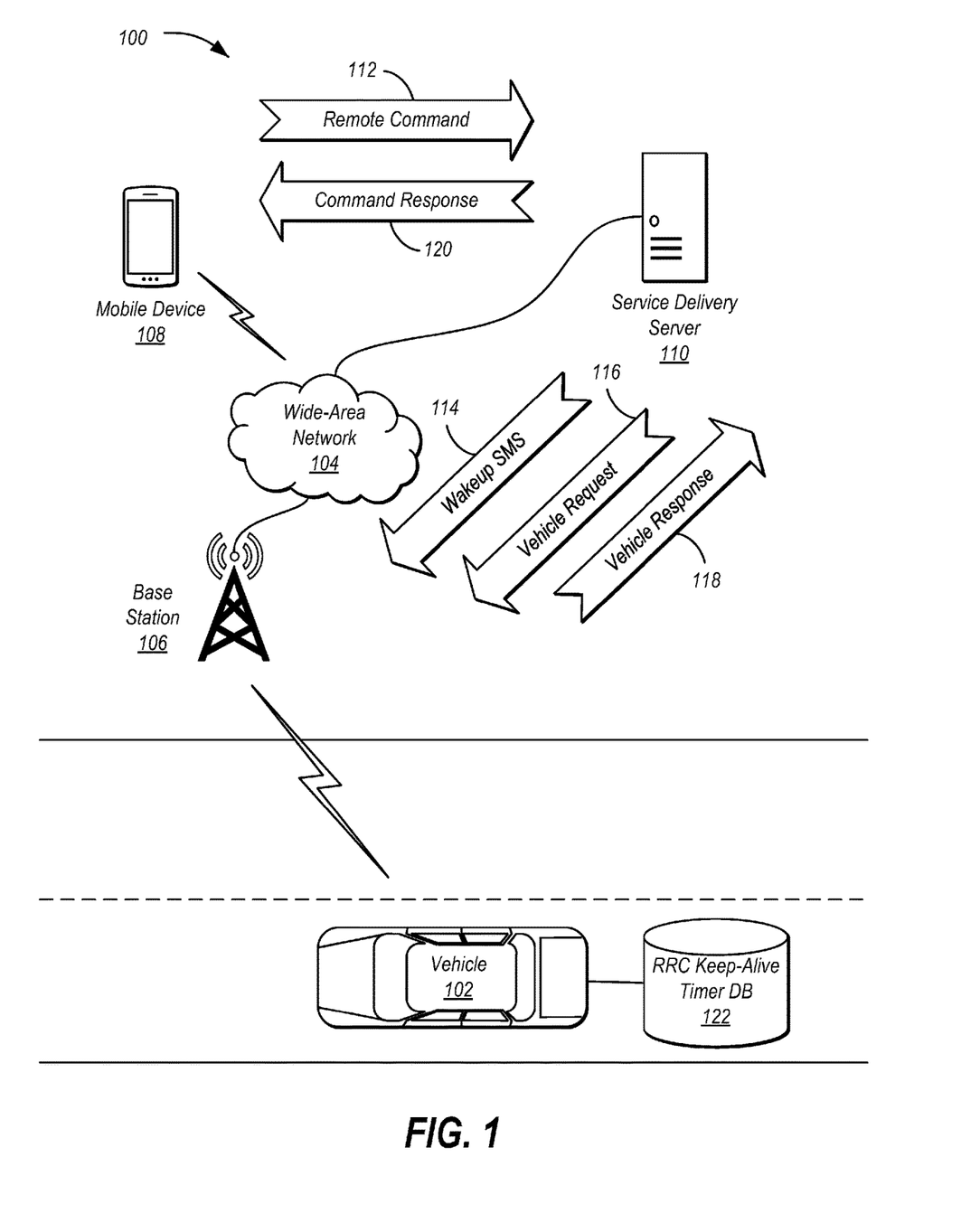
FIG. 1 illustrates an example system for processing remote commands by a vehicle.

FIG. 1 illustrates an example system 100 for processing remote commands 112 by a vehicle 102. As shown, the system 100 includes a vehicle 102 in communication with a service delivery server 110 over a wide-area network 104. The vehicle 102 is configured to wirelessly communicate with base stations 106 connected to the wide-area network 104. Only one base station 106 is shown for clarity, but it should be noted that systems 100 typically include many base stations 106 arranged to cover a large geographical area. While an example system 100 is shown in FIG. 1, the example components as illustrated are not intended to be limiting. Indeed, the system 100 may have more or fewer components, and additional or alternative components and/or implementations may be used. As an example, the system 100 may include more or fewer vehicles 102 or base stations 106.

The vehicles 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume.

The wide-area network 104 may include one or more interconnected communication networks such as the Internet, a cable television distribution network, a satellite link network, a local area network, and a telephone network, as some non-limiting examples. By accessing the wide-area network 104, the vehicle 102 may be able to send outgoing data from the vehicle 102 to network destinations on the wide-area network 104, and receive incoming data to the vehicle 102 from network destinations on the wide-area network 104.

The base stations 106 may include system hardware configured to allow cellular transceivers of the vehicles 102 to access the communications services of the wide-area network 104. In an example, the base stations 106 may be part of a Global System for Mobile communication (GSM) cellular service provider. In another example, the base stations 106 may be part of a code division multiple access (CDMA) cellular service provider. The base stations 106 may support various different technologies and data speeds. For instance, the base stations 106 may support 3G, 4G LTE, and/or 5G communications technologies.

A mobile device 108 may be any of various types of portable computing device, such as cellular phones, tablet computers, smart watches, laptop computers, portable music players, or other devices capable of communication with the vehicle 102 over the wide-area network 104. The mobile device 108 may include one or more processors configured to execute computer instructions, and a storage medium on which the computer-executable instructions and/or data may be maintained.

The service delivery server 110 may include computing hardware configured to provide command and data services to the vehicles 102. These services may include, as some examples, remote locking and unlocking of vehicle doors, over-the-air software updating, and provisioning of traffic and navigation information.

A remote command 112 is a message sent from the mobile device 108 over the wide-area network 104 to the service delivery server 110 to request an action to be performed by a vehicle 102. As some examples, the remote command 112 may be a request for the vehicle 102 to unlock doors, lock doors, or remote start the engine.

A wakeup message 114 may be a SMS or other circuit-switched message sent to the vehicle 102 from the service delivery server 110. The wakeup message 114 may be sent responsive to receipt by the service delivery server 110 of the remote command 112. For instance, if the vehicle 102 is identified by the service delivery server 110 as being in low power mode (e.g., because a packet-switched connection over the wide-area network 104 between the vehicle 102 and the service delivery server 110 is not available), the service delivery server 110 may send the wakeup message 114 to the vehicle 102 that is the target of the remote command 112. Responsive to receipt of the wakeup message 114, the vehicle 102 may be configured to reestablish a packet-switched cloud connection with the service delivery server 110.

Once a packet-switched connection is available (or if the connection was already available), the service delivery server 110 may send a vehicle request 116 to the vehicle requesting for the vehicle 102 to perform the operation specified by the remote command 112. The vehicle 102 may receive the vehicle request 116 and send a vehicle response 118 to the service delivery server 110 in response. The vehicle response 118 may indicate a result of the command, such as whether doors were successfully unlocked or whether the vehicle 102 was successfully started. In turn, the service delivery server 110 may receive the vehicle response 118 and send a command response 120 to the mobile device 108 indicative of the information included in the vehicle response 118.

Figure 2:
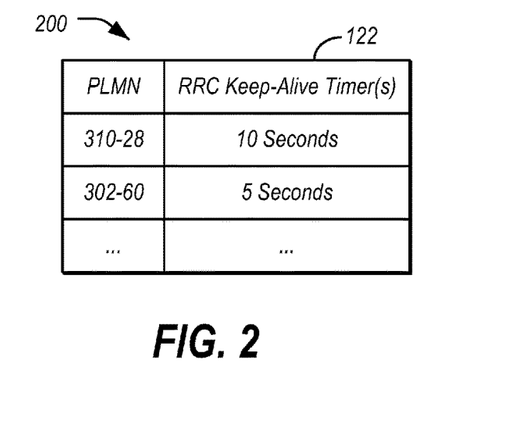
FIG. 2 illustrates an example of a RRC keep alive timer database.

After a predetermined amount of time of inactivity on over the wide-area network 104, RRC on the wide-area network 104 may transition to idle. On some networks, this transition from active to idle may occur after expiration of a timer of, e.g., a 10 second timeout during which no network activity is detected. In some examples, the vehicle 102 may be configured to maintain a RRC keep alive timer database 122. For example, the RRC keep alive timer database 122 may include data entries that specify lengths of time until this transition to idle, indexed according to the base station 106 or other PLMN to which the vehicle 102 is currently connected. An example 200 of a RRC keep alive timer database 122 is shown in FIG. 2.

Figure 3:
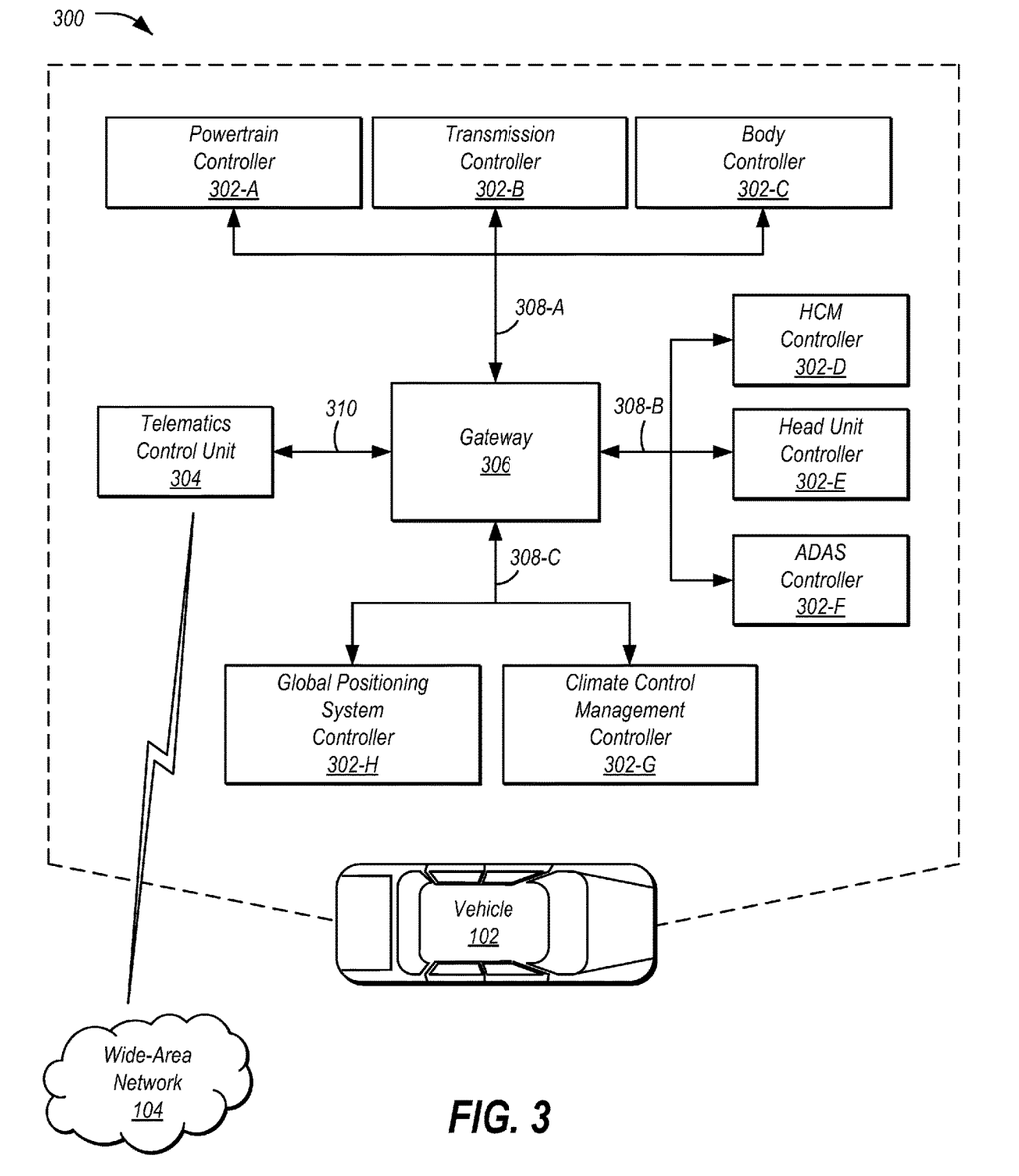
FIG. 3 illustrates an example topology for messaging of commands received over the wide-area network.

FIG. 3 illustrates an example topology 300 for messaging of commands received over the wide-area network 104. Each electronic control unit (ECU) 302 may be connected to one of a plurality of subnets 308. A telematics control unit (TCU) 304 is included to facilitate communication between various components of the vehicle 102 and the wide-area network 104. The TCU 304 may be connected to a backbone 310 portion of the topology 300 and may communicate with the ECUs 302 via a gateway 306. While an example topology 300 is shown in FIG. 3, the example components as illustrated are not intended to be limiting. Indeed, the topology 300 may have more or fewer components, and additional or alternative components and/or implementations may be used. As an example, the ECUs 302 and the TCU 304 may each be connected to one or more same or different types of nodes as the subnets 308 and the backbone 310.

The ECUs 302 may include various hardware and software components configured to monitor and manage various vehicle functions. The ECUs 302 may, accordingly, include one or more processors (e.g., microprocessors) (not shown) configured to execute firmware or software programs stored on one or more storage devices (not shown) of the ECUs 302. While the ECUs 302 are illustrated as separate components, the vehicle ECUs 302 may share physical hardware, firmware, and/or software, such that the functionality from multiple ECUs 302 may be integrated into a single ECU 302, and the functionality of various such ECUs 302 may be distributed across a plurality of ECUs 302.

The ECUs 302 may include a powertrain controller 302-A configured to manage operating components related to one or more vehicle sources of power, such as engine, battery, and so on, a transmission controller 302-B configured to manage power transfer between vehicle powertrain and wheels, a body controller 302-C configured to manage various power control functions, such as exterior lighting, interior lighting, keyless entry, remote start, and point of access status verification, a headlamp control module (HCM) 302-D configured to control light on/off settings, a head unit controller 302-E configured to drive UI displays to the user, advanced driver assistance systems (ADAS) 302-F such as adaptive cruise control or automated braking, a climate control management controller 302-G configured to monitor and manage heating and cooling system components (e.g., compressor clutch, blower fan, temperature sensors, etc.), a global positioning system (GPS) controller 302-H configured to provide vehicle location information. It should be noted that these are merely examples and vehicles 102 having more, fewer, or different ECUs 302 may be used.

The TCU 304 may include one or more processors (not shown) (e.g., microprocessors) configured to execute firmware or software programs stored on one or more respective storage devices of the TCU 304. The TCU 304 may include a modem or other network hardware to facilitate communication between the vehicle 102 and other devices connected to the wide-area network 104.

The gateway 306 may be configured to facilitate data exchange between vehicle ECUs 302. The gateway 306 may be further configured to facilitate data exchange between the vehicle ECUs 302 and the TCU 304 located on the backbone 310. In an example, the vehicle ECUs 302 and the TCU 304 may communicate with the gateway 306 using CAN communication protocol, such as, but not limited to, a high-speed (HS) CAN, a mid-speed (MS) CAN, or a low-speed (LS) CAN. Different subnets 308 may utilize different CAN protocol speeds. In an example, one or more of the subnets may implement HS-CAN, while one or more other subnets 308 may implement MS-CAN. In yet other examples, the gateway 306 may be configured to facilitate communication using one or more of an Ethernet network, a media-oriented system transfer (MOST) network, a FlexRay network, or a local interconnect network (LIN).

One or more of the subnets 308 may define a main subnet, which may be referred to as a backbone 310. The backbone 310 may include a portion of the topology 300 configured to serve as a joining point of communication for the other subnets 308 of the vehicle 102. Accordingly, the backbone 310 may be configured to manage and route data traffic in a greater volume than that provided via the other subnets 308. Using the message processing features of the gateway 306, the gateway 306 may be configured to transmit message frames between the TCU 304 located on the backbone 310 and the one or more of the vehicle ECUs 302 located on the other subnets 308.

The gateway 306 may be configured to identify on which subnet 308 each of the ECUs 302 and TCU 304 is located. This may be accomplished according to a corresponding physical network address of the ECUs 302 and TCU 304. In an example, in response to receiving a request to route a message to a given ECU 302 or the TCU 304, the gateway 306 may query a storage to identify a network address corresponding to the ECU 302 or the TCU 304. For instance, the gateway 306 may include a storage configured to store the network addresses, as well as a routing schema defining which messages are routed to which subnets 308 and/or backbone 310. This routing may be determined by the gateway 306 based on predefined parameters included in the message, such as a type of message and/or identifiers of the ECUs 302 or the TCU 304 that designate the source and/or target of the message.

Figure 4:
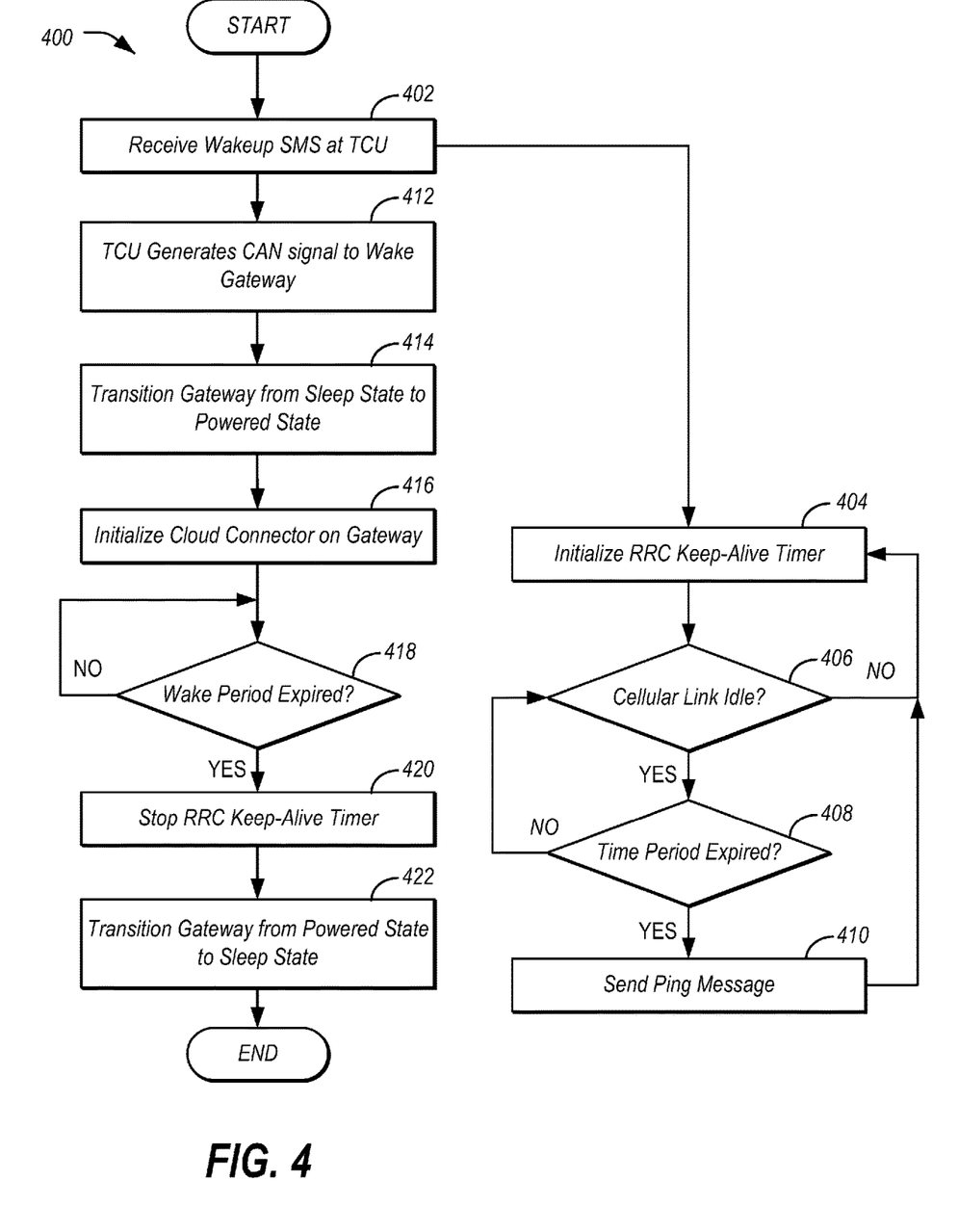
FIG. 4 illustrates an example process for reducing command round trip time by keeping RRC active after receiving a wakeup message for vehicle remote commands during a low power mode.

FIG. 4 illustrates an example process 400 for reducing command round trip time by keeping RRC active after receiving a wakeup short message service (SMS) message for vehicle remote command during a low power mode.

At 402, the vehicle 102 receives a wakeup message 114. In an example the TCU 304 of the vehicle 102 receives the wakeup message 114 over SMS from the service delivery server 110.

Figure 5:
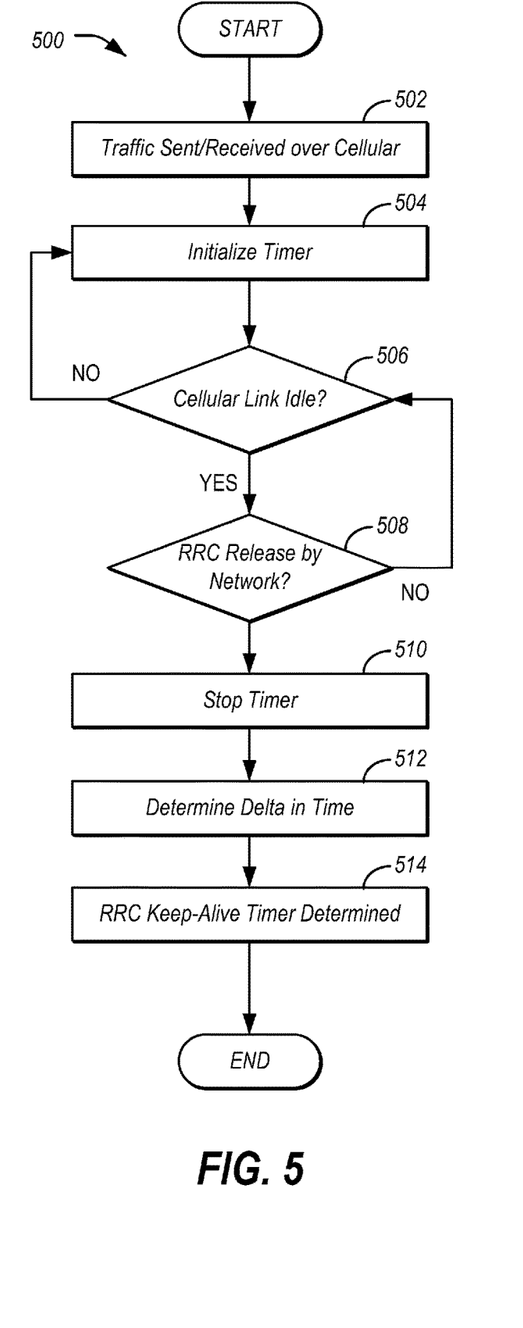
FIG. 5 illustrates an example process for performing RRC keep-alive self-learning.
Figure 6:
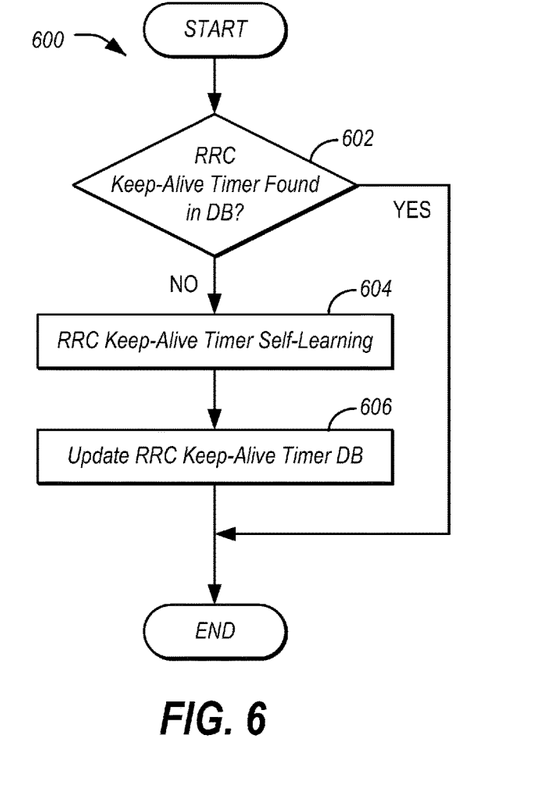
FIG. 6 illustrates an example process for updating the RRC keep-alive timer database.

At 404, in response to reception of the wakeup message 114, the vehicle 102 initializes a RRC keep-alive timer. In an example, the RRC timer may have a period that is shorter than the amount of time after which the RRC tears down. In another example, the value of RRC timer can be determined by looking up the RRC keep alive timer database 122. In yet another example, the vehicle 102 can go through self-learning to determine the value of the RRC keep alive timer and may update the RRC keep alive timer database 122 accordingly. Further aspects of initialization of the RRC keep-alive timer are discussed in relation to the processes 500 and 600 below.

At operation 406, the vehicle 102 determines whether the cellular link is idle. If not, then control returns to operation 404. If the link is idle, however, control passes to operation 408 to determine whether the timer has expired. If so, control passes to operation 410 to send a periodic ping message to the RRC to keep the RRC interface up. Otherwise, control passes back to operation 406 to continue determining whether the cellular link is idle. After operation 410, control returns to operation 404.

At 412, also in response to reception of the wakeup message 114 at operation 402, the vehicle 102 generates a CAN signal to wake the gateway 306. In an example the signal may be generated by the TCU 304, and sent over the backbone 310 to the gateway 306. At 414, responsive to receipt of the CAN signal, the vehicle 102 transitions the gateway 306 from sleep state to powered state. In an example, the gateway 306 wakes, updates its state, and control passes to operation 416 to initializes the cloud connector on the gateway 306.

At 418, the vehicle 102 determines whether the wake period for the gateway 306 has expired. In an example, the gateway 306 may remain active for 3 minutes after being woken. In another example, the gateway 306 may remain active as long as there are commands from the service delivery server 110. If the period has expired, control passes to operation 420. Otherwise, control remains at operation 418.

At 420, the vehicle 102 stops the RRC keep-alive timer that was initialized at operation 404. As the gateway is transitioning down to sleep mode, the RRC is no longer required. At 422, the vehicle 102 transitions the gateway 306 from powered state to sleep state. After operation 422, the process 400 ends.

Accordingly, by keeping RRC active after receiving the wakeup message 114 by sending ping messages, the system 100 can improve the overall response time by 250 milliseconds (under LTE) and 900 milliseconds (under 3G) coverage. Thus, whenever the cloud connector is ready to send data, RRC is already up and ready to interact with the wide-area network 104.

It should be noted that while sending ping messages is discussed in many examples herein as the mechanism for keeping RRC active, other mechanisms may be additionally or alternately be utilized for keeping RRC active. For instance, the RRC may be kept active by sending vehicle diagnostic reports, performing software downloads, etc.

FIG. 5 illustrates an example process 500 for performing RRC keep-alive self-learning. At operation 502, the vehicle 102 sends or receives traffic via a cellular connection. In an example, the vehicle 102 may receive a command or a software update from a remote server or may send a message to a remote server over the connection. At 504, the vehicle 102 initializes a timer. In an example, responsive to the sending or receiving of the traffic, the vehicle 102 may reset a timer (e.g., set to zero time) that may be used to measure delay time for RRC keep-alive. At operation 506, the vehicle 102 determines whether the cellular link is idle. If not, control returns to operation 504 to reinitialize the timer. If the link becomes idle, control passes to operation 508.

At 508, the vehicle 102 determines whether RRC was released by the cellular network. If not, control returns to operation 506. If so, control passes to operation 510 to stop the timer that was initialized at operation 504. Next, at operation 512, the vehicle 102 determines a delta in time. For example, the vehicle 102 identifies the amount of time that the timer initialized at operation 504 has ran.

At operation 514, the vehicle 102 determines a value for the RRC keep-alive timer based on the delta in time. In an example, the vehicle 102 adds an entry to the RRC keep-alive timer database 122 (or updates an entry in the RRC keep-alive timer database 122) with the identified timer value that specifies the amount of time before RRC is released by the network. The time entry in the RRC keep-alive timer database 122 may be indexed according to the current PLMN to which the vehicle 102 is currently connected. After operation 514, the process 500 ends.

FIG. 6 illustrates an example process 600 for updating the RRC keep-alive timer database 122. In an example, the process 600 may be triggered responsive to a request at operation 404 to identify the RRC keep-alive timer value to initialize the RRC keep-alive timer.

At operation 602, the vehicle 102 determines whether a RRC keep-alive timer value is available in the RRC keep-alive timer database 122. For instance, the vehicle 102 may attempt to look up a RRC keep-alive timer value in the RRC keep-alive timer database 122 according to an identifier of a PLMN to which the vehicle 102 is currently connected to the wide-area network 104. If a value is located in the RRC keep-alive timer database 122, then that value may be used. If not, control passes to operation 604 to perform self-learning of the RRC keep-alive timer value. An example process 500 for performing the learning is described above.

At operation 606, the RRC keep-alive timer value learned at operation 604 is updated into the RRC keep-alive timer database 122. In an example, the value may be added to the RRC keep-alive timer database 122, indexed according to an identifier of a PLMN to which the vehicle 102 is currently connected to the wide-area network 104. After operation 606, the process 600 ends.

In general, computing systems and/or devices, such as the mobile device 108, service delivery server 110, controllers 302, TCU 304, and gateway 306, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance.

Computing devices such as the mobile device 108, service delivery server 110, controllers 302, TCU 304, and gateway 306, generally include computer-executable instructions that may be executable by one or more processors of the computing devices. Computer-executable instructions may be compiled or interpreted from computer programs created using a variety of programming languages and/or technologies, including, without limitation, and either alone or in combination, JAVA™, C, C++, VISUAL BASIC, JAVA SCRIPT, PERL, etc. In general, a processor or microprocessor receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computing device). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein. Some or all of the operations disclosed herein as being performed may be such computer program products. In some examples, these computer program products may be provided as software that when executed by one or more processors provides the operations described herein. Alternatively, the computer program products may be provided as hardware or firmware, or combinations of software, hardware, and/or firmware.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   a gateway; and
   a telematics controller, programmed to
      generate a signal to transition the gateway from a sleep state to a powered state responsive to receipt of a circuit-switched wakeup message over a network, the gateway requiring a period of time to transition from the sleep state to the powered state;
      additionally responsive to receipt of the circuit-switched wakeup message, initialize a gateway cloud connector and a timer to periodically send ping messages to keep radio resource control (RRC) alive during the period of time to improve overall response time for messages to or from the vehicle by an amount of time required to reestablish RRC; and
      responsive to inactivity over the network for a predefined period, discontinue the timer and transition the gateway from powered to sleep state.

2. The vehicle of claim 1, wherein the timer is configured to periodically send the ping messages using a period approximately half of a timeout period that, when expired, causes a teardown of radio resource control.

3. The vehicle of claim 1, wherein the telematics controller is further programmed to:
   receive a vehicle request over the network from a service delivery server;
   send the vehicle request to the gateway;
   receive a response from the gateway indicating a result of the vehicle request; and
   send a vehicle response to the service delivery server indicating the result.

4. The vehicle of claim 3, wherein the vehicle request is one of: a door unlock command, a door lock command, a window down command, a window up command, or a remote start command.

5. The vehicle of claim 3, wherein the telematics controller is further programmed to determine activity over the network within the predefined period responsive to receipt of the vehicle request.

6. The vehicle of claim 1, wherein the inactivity over the network includes a lack of receipt of a message over the network from a service delivery server.

7. The vehicle of claim 1, wherein the gateway is connected to the telematics controller over a controller area network (CAN) connection.

8. The vehicle of claim 1, wherein the gateway is programmed to transition from powered to sleep state responsive to the vehicle being powered off for a predetermined period.

9. The vehicle of claim 1, further comprising a memory storing a database of radio resource control timeout values indexed by public land mobile network identifier, wherein the telematics controller is further programmed to identify the period for periodically sending the ping messages to keep radio resource control alive by querying the database for the period according to an identifier of a public land mobile network identifier to which the vehicle is connected.

10. A method performed by a telematics controller comprising:
    transitioning a gateway of a vehicle from a sleep state to a powered state responsive to receipt of a circuit-switched wakeup message over a network, the gateway requiring a period of time to transition from the sleep state to the powered state;
    additionally responsive to receipt of the circuit-switched wakeup message, initializing a gateway cloud connector and periodically sending ping messages to keep radio resource control (RRC) alive during the period of time to improve overall response time for messages to of from the vehicle by an amount of time required to reestablish RRC; and
    responsive to inactivity over the network for a predefined period, discontinuing the ping messages and transitioning the gateway from powered to sleep state.

11. The method of claim 10, further comprising identifying activity over the network within the predefined period responsive to receipt of a vehicle request from a service delivery server.

12. The method of claim 11, wherein the vehicle request is one of: a door unlock command, a door lock command, a window down command, a window up command, or a remote start command.

13. The method of claim 11, further comprising identifying inactivity over the network responsive to a lack of receipt of a vehicle request from a service delivery server over the network.

14. The method of claim 10, further comprising transitioning from powered to sleep state responsive to the vehicle being powered off for a predetermined period.

15. The method of claim 10, further comprising:
    determining a delta in time between a cellular link becoming inactive and radio resource control being released by the network;
    identifying a public land mobile network identifier of a public land mobile network to which the vehicle is connected via the cellular link; and
    adding the delta in time to a database of radio resource control timeout values indexed by the public land mobile network identifier.

16. The method of claim 10, further comprising:
    utilizing a delta in time between a cellular link becoming inactive and radio resource control being released by the network as the period for periodically sending the ping messages to keep radio resource control alive.

17. A non-transitory computer readable medium comprising instructions that, when executed by one or more processors of a telematics controller a vehicle, cause the telematics controller to:

transition a vehicle gateway from a sleep state to a powered state responsive to receipt of a circuit-switched wakeup message over a network, the gateway requiring a period of time to transition from the sleep state to the powered state;

initialize a gateway cloud connector and periodically sending ping messages to keep radio resource control (RRC) alive during the period of time to improve overall response time for messages to or from the vehicle by an amount of time required to reestablish RRC; and responsive to inactivity over the network for a predefined period, discontinue the ping messages and transition the gateway from powered to sleep state.

18. The medium of claim 17, further comprising instructions that, when executed by the one or more processors, cause the telematics controller to identify activity over the network within the predefined period responsive to receipt of a vehicle request from a service delivery server.

19. The medium of claim 17, further comprising instructions that, when executed by the one or more processors, cause the telematics controller to identify inactivity over the network responsive to a lack of receipt of a vehicle request from a service delivery server over the network.

20. The medium of claim 17, further comprising instructions that, when executed by the one or more processors, cause the telematics controller to transition from powered to sleep state responsive to the vehicle being powered off for a predetermined period.

* * * * *